United States Patent
Blanchard et al.

(10) Patent No.: US 7,536,539 B2
(45) Date of Patent: May 19, 2009

(54) METHOD AND APPARATUS FOR DISCOVERING HARDWARE IN A DATA PROCESSING SYSTEM

(75) Inventors: Anton Blanchard, Marrickville (AU); Milton Devon Miller, II, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/912,505

(22) Filed: Aug. 5, 2004

(65) Prior Publication Data

US 2006/0031598 A1 Feb. 9, 2006

(51) Int. Cl.
*G06F 9/00* (2006.01)
*G06F 3/01* (2006.01)
(52) U.S. Cl. .............. 713/2; 710/2; 710/8; 710/15
(58) Field of Classification Search ............ 710/2, 710/8, 15; 713/2
See application file for complete search history.

(56) References Cited

U.S. PATENT DOCUMENTS 6,263,378 B1    7/2001    Rudoff et al.
6,349,347 B1    2/2002    Porterfield
6,529,964 B1 *  3/2003    Schwendiman .......... 710/8
6,732,264 B1    5/2004    Sun et al.
6,944,756 B2 *  9/2005    Thomas, III .......... 713/1
2002/0169949 A1* 11/2002   Shenassa et al. ....... 713/1
2002/0184483 A1  12/2002   Morrison et al.

OTHER PUBLICATIONS

IBM: Kernel Extensions and Device Support Programming; http://publib.boulder.ibm.com/infocenter/pseries/v5r3/index.jsp?topic=/com.ibm.aix.kernelext/doc/kernelextc/kern_threads.htm.*
IBM; Kernel Extensions and Device Support Programming; Printed Mar. 27, 2007; http://publib.boulder.ibm.com/infocenter/pseries/v5r3;index.jsp?topic=/com.ibm.aix.kernelext/doc/kernelextc/kern_threads.htm.*

* cited by examiner

*Primary Examiner*—Hyung S Sough
*Assistant Examiner*—Kris Rhu
(74) *Attorney, Agent, or Firm*—Yee & Associates, P.C.; Diana R. Gerhardt

(57) ABSTRACT

A method, apparatus and computer instructions for discovering hardware nodes having a hierarchical organization. A subset of the hardware nodes in the data processing system is initialized prior to loading an operating system supporting parallel threads. In response to loading the operating system, thread for each hardware node discovered below a known hardware node is created to form a set of threads.

1 Claim, 4 Drawing Sheets

US 7,536,539 B2

METHOD AND APPARATUS FOR DISCOVERING HARDWARE IN A DATA PROCESSING SYSTEM

BACKGROUND OF THE INVENTION

1. Technical Field

The present invention relates generally to an improved data processing system and in particular to a method and apparatus for processing data. Still more particularly, the present invention relates to a method, apparatus, and computer instructions for hardware discovery in a data processing system.

2. Description of Related Art

When a computer is powered on, a boot program is used to boot or start the computer executing instructions. The boot program is employed to prepare the system for the operating system, load the operating system and then pass control of the computer to the operating system. Typically, the boot program is a boot firmware found on the data processing system. In some cases, the boot program may be distributed by a server on a network. The boot program probes and initializes the hardware in the system before finding and loading the operating system. When control is passed to the operating system, the boot process has been completed, but the full system initialization is not.

In probing and initializing the data processing system, the boot program typically probes or interrogates busses in the data processing system to find and initialize hardware components. These hardware components include, for example, an I/O bridge, a small computer system interface (SCSI) adapter, a network adapter, a monitor, a disc drive, a keyboard, or a tape drive. The boot program sends out requests for identification from various hardware components. In turn, the hardware components may return information, such as identifiers, which are used by the group program to identify and initialize the hardware components. In other words, the boot program interrogates the bus to identify components that may be connected to the bus.

After the boot program has identified the hardware components in the data processing system, the boot program then loads the operating system and passes control of the data processing system to the operating system. At that point, the operating system runs and controls the different aspects of the data processing system.

With large data processing systems, a planned or unplanned shutdown or restart of a data processing system may take a large amount of time. The amount of time needed to restart the operating system changes depending on the number of busses and components attached to those busses. Adding additional components to a data processing system increases the time needed to restart the data processing system because additional time is required to identify and initialize those components during the boot process.

The time needed to reboot a large data processing system, such as a server data processing system, is often inconvenient for users. Therefore, it would be advantageous to have an improved method, apparatus, and computer instructions for restarting or booting a data processing system as this represents time the data processing system is not available to perform its intended task.

SUMMARY OF THE INVENTION

The present invention provides a method, apparatus and computer instructions for discovering hardware nodes having a hierarchical organization. A subset of the hardware nodes in the data processing system is initialized prior to loading an operating system supporting parallel threads. In response to loading the operating system, a thread for each hardware node discovered below a known hardware node is created to form a set of threads.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
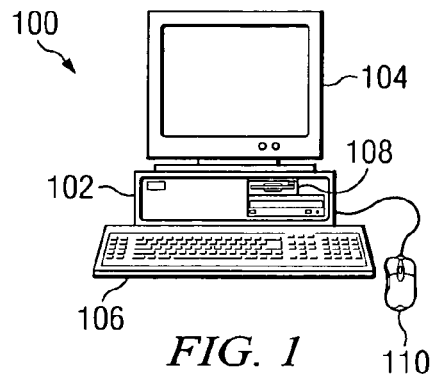
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer.

Figure 2:
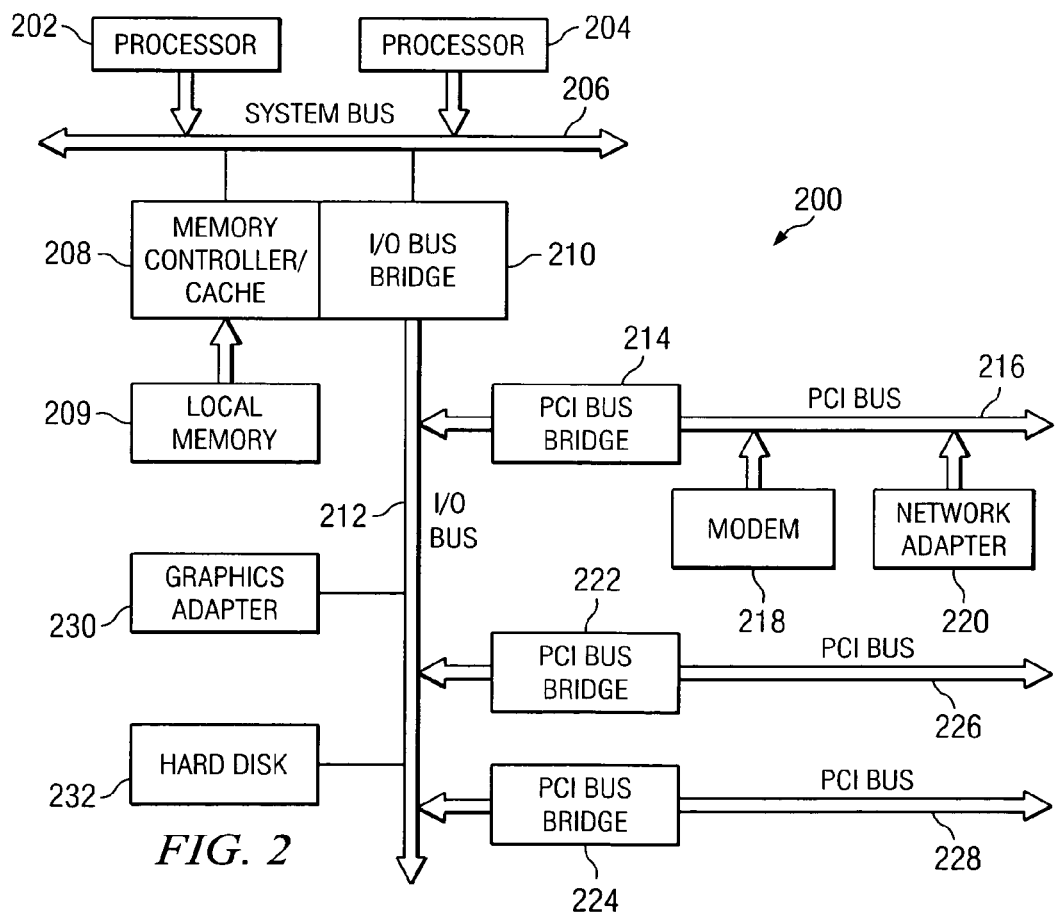
FIG. 2 is a block diagram of a data processing system that may be implemented in accordance with a preferred embodiment of the present invention.

Referring to FIG. 2, a block diagram of a data processing system that may be implemented as a data processing system computer 100 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a method, apparatus, and computer instructions for reducing boot times. Specifically, the mechanism of the present invention reduces the amount of time needed to perform the discovery of devices during the boot process prior to loading of the operating system. Only a subset of the hardware components are identified or discovered during the initial boot process. The hardware devices, also referred to as hardware nodes, in this subset are ones that are necessary for operation of a data processing system in the illustrative examples. Additional components known not to be needed to load and control the operating system are not discovered. Instead, the hardware discovery for these nodes are deferred until a operating system is loaded and a multi-threaded environment is present. Only a portion of the hardware nodes are identified because operating systems typically will perform their own discovery of the whole hardware system before looking for other resources, such as the main file system. As a result, performing discovery of all of the hardware nodes in the data processing system prior to loading of the operating system is redundant and unnecessary.

Preferably additional boot-time reduction is obtained by the deferral of the discovery of the whole data processing system until the user-space environment is operational. The mechanism of the present invention also takes advantage of a multi-threaded environment after the operating system has been loaded to speed up the boot process. Each time a hardware node is located, the mechanism of the present invention creates a new thread to identify additional nodes.

A thread is one transaction or method in a multi-threaded system. A thread is a basic unit of processor utilization in these examples and typically includes a program counter, a register set, and a stack space. A multi-threaded system allows for multi-tasking. Multiple streams of execution may take place concurrently within the same program with each thread or stream processing a different transaction or message.

The hardware nodes in a data processing system are arranged in a hierarchical manner. For example, an I/O bridge, such as I/O bridge 210 has daughter or child nodes, such as PCI bridge 214, PCI bridge 222, PCI bridge 224, graphics adapter 230, and hard disc 232. PCI bridge 214 in FIG. 2 is a node having child nodes in the form of modem 218 and network adapter 220.

Figure 3:
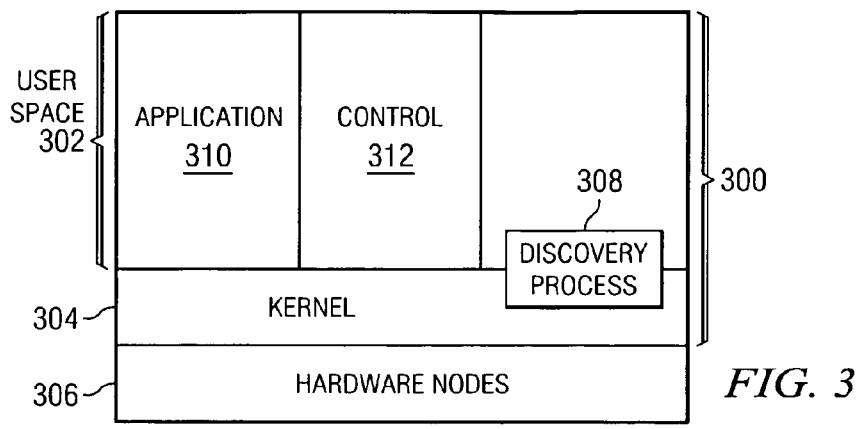
FIG. 3 is a diagram illustrating components used in performing deferred discovery of hardware in accordance with a preferred embodiment of the present invention.

Turning now to FIG. 3, a diagram illustrating components used in performing deferred discovery of hardware is depicted in accordance with the preferred embodiment of the present invention. In this example, operating system 300 includes user space 302 and kernel 304. Kernel space is strictly reserved for running the kernel. The kernel is a piece of software responsible for providing secure access to hardware for various computer programs in user space. In these examples, the hardware takes the form of hardware nodes 306. These hardware nodes include, for example, components such as network adapters, disk drives, SCSI adapters, I/O bridges, and monitors. Discovery process 308 provides a process for deferred hardware discovery in a multi-threaded environment such as that provided by operating system 300.

The discovery of the additional hardware nodes does not occur until after user space 302 becomes operational. User space 302 provides space for processes, such as application 310 and control process 312. Control process 312 may be used to control operating system 300.

In this example, discovery process 308 is located in both user space 302 and kernel 304. Depending on the particular implementation, discovery process 308 may be located entirely within kernel 304 or within user space 302. Discovery process 308 provides for the discovery and initialization of hardware after operating system 300 has taken control of the data processing system.

Discovery process 308 creates a thread for each node discovered within hardware nodes 306. More specifically, a thread is created for each hardware node that is connected to a bus on a level below the hardware node. In this manner, the mechanism of the present invention allows for parallel discovery and initiation of hardware within hardware nodes 306. As a result, the amount of time needed to discover and initialize hardware is reduced.

After the limited subset of nodes is discovered, this discovered process is suspended until user space is active. At that time, the discovery process is resumed through discovery process 308. The resumption of the discovery process using discovery process 308 may be initiated through control process 312.

Hardware discovery takes additional time because some hardware nodes may take more time to respond than others. For example, a disk drive requires time to spin up before responding to requests during the boot up process. Thus, if parallel discovery does not occur, the discovery and initialization of the next hardware node must wait until the disk drive has spun up and responded. With the mechanism of the present invention, this wait time is unnecessary because another thread may perform discovery processes separate from the thread waiting on the disk drive to respond.

Figure 4:
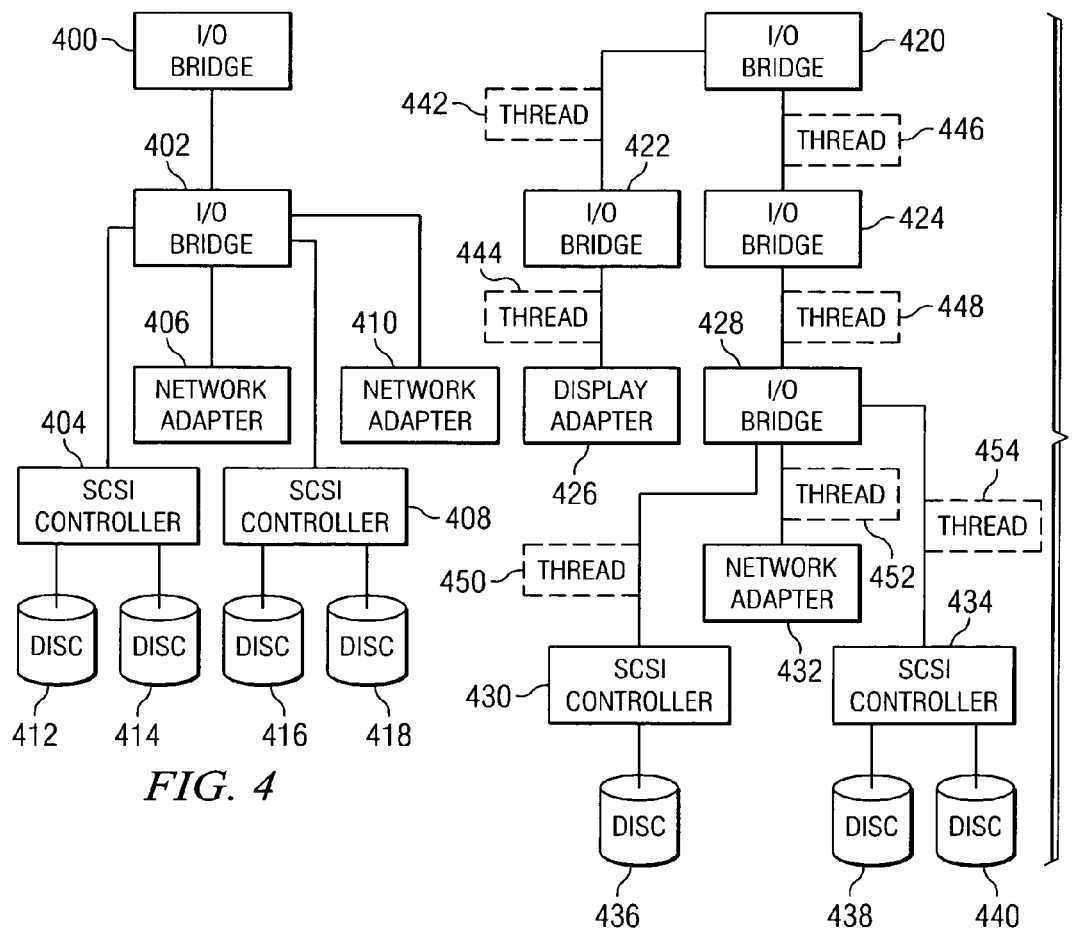
FIG. 4 is a diagram illustrating hardware nodes and their associated threads used in their discovery through a deferred hardware discovery process in a multi-threaded environment in accordance with a preferred embodiments of the present invention.

Turning next to FIG. 4, a diagram illustrating hardware nodes and their discovery through a deferred hardware discovery process in a multi-threaded environment is depicted in accordance with the preferred embodiments of the present invention. The hardware nodes illustrated in FIG. 4 are examples of components such as found in data processing system 200 in FIG. 2. In this illustrative example, I/O bridge 400 is connected to I/O bridge 402. I/O bridge 402 has connections to SCSI controller 404, network adapter 406, SCSI adapter 408, and network adapter 410. SCSI controller 404 is connected to disk 412 and disk 414 SCSI controller 408 has a connection to disk 416 and disk 418.

In this example I/O bridge 420 has a connection to I/O bridge 422 and I/O bridge 424. I/O bridge 422 is connected to display adapter 426. I/O bridge 424 has a connection to I/O bridge 428. I/O bridge 428 is connected to SCSI controller 430, and network adapter 432, and SCSI controller 434. SCSI controller 430 is connected to disk 436. SCSI controller 434 is connected to disk 438 and disk 440.

Disk 412 and disk 414 are connected to SCSI controller 404 through a SCSI bus. As depicted, the components are connected to each other in a hierarchical fashion. I/O bridge 400 is a hardware node in which I/O bridge 402 is a child node on a level below I/O 400. I/O bridge 400 is connected to I/O bridge 402 via a bus, such as an I/O bus. This bus may be, for example, I/O bus 212 in FIG. 2. As a further example, SCSI controller 404, network adapter 406, SCSI controller 408 and network adapter 410 are child nodes to I/O bridge 402 on a level below I/O bridge 402. These hardware nodes are connected to I/O bridge 402 through a bus, such as an I/O bus or a PCI bus.

In accordance with an illustrative embodiment of the present invention, a boot process does not discover and initialize all of the hardware nodes illustrated in FIG. 4. Instead, only a subset of these hardware nodes are discovered and initialized by the boot process. In this particular example, I/O bridge 400, I/O bridge 402, SCSI controller 404, disk 412, and network adapter 406 are the components that are identified and initialized by the boot process. Additionally, to simplify the required hardware description one may choose to probe all nodes beneath I/O bridge 402.

The particular components that are to be identified and initialized during the boot up process may be stored in a configuration file or some other data structure. This data structure is accessed by the boot process to determine which components to discover and initialize during the initial boot process prior to loading the operating system. In these depicted examples, these components are selected as a minimum subset that is required for the operating system to be loaded and take control of the data processing system in these illustrative examples. An example of minimal requirements for an initial boot include storage of base file system, console (graphics adapter, serial port, keyboard, etc.), and optionally control and administration network adapters.

After the operating system has been loaded and has taken control and preferably after it has preformed initialization of minimal hardware subset and user-space environment is operational, the remainder of the hardware nodes are then discovered and initialized in accordance with illustrative embodiments of the present invention. This process may be implemented in a discovery process, such as discovery process 308 in FIG. 3.

Discovery process 308 creates a thread for each hardware node. A thread created for a hardware node is used to discover and initialize components connected to that hardware node on a level below the hardware node in the hierarchical structure of hardware components. In particular, the thread interrogates a bus for hardware nodes on the level below the hardware node associated with the thread. Interrogation of the bus leading back to an upper level is not performed by this thread. In these examples, the threads are for probing ports and/or possible connection points for additional hardware connected to a given node.

For example, thread 442 is generated by a discovery process for bridge 420. Thread 442 interrogates busses attached to I/O bridge 420 to locate other hardware nodes. For example, thread 442 may discover I/O bridge 422 and I/O bridge 424. In response to these two hardware nodes being discovered, thread 444 and thread 446 are created.

Thread 444 searches for hardware nodes on a level below I/O bridge 422. Thread 444 does not interrogate the bus connecting I/O bridge 422 to I/O bridge 420. Thread 446 searches for hardware nodes on a level below I/O bridge 424. Thread 444 discovers display adapter 426. Thread 446 discovers I/O bridge 428.

In discovering I/O bridge 428, thread 448 is created. This thread discovers SCSI controller 430, network adapter 432, and SCSI controller 434. In discovering each of these hardware nodes, threads (not illustrated) are created to perform further discovery of hardware nodes. Specifically, threads 450, 452, and 454 are created for SCSI controller 430, network adapter 432 and SCSI controller 434, respectively. These threads proceed to perform discovery processes for any hardware nodes that may be connected to these nodes.

In this manner, parallel threads may execute concurrently to discover and initialize components for the operating system. These threads take advantage of the multi-tasks and multi-threaded environment that is provided by the operating system. Thus, faster discovery of hardware nodes occurs.

As a result, the time for the process of restarting or booting the data processing system is reduced by only discovering a subset of the hardware nodes prior to control being passed through the operating system. This reduced discovery and initialization of components reduces the amount of time to boot or restart a data processing system because fewer components are discovered by both the boot and operating system code. Additional reduction in time is achieved through starting the user space and then finishing probing of the data processing system for the remaining hardware.

Further, by using a parallel discovery process, through employing multiple threads in a multi-threaded environment, the process of discovery hardware nodes is sped up as compared to a serial discovery process in which hardware nodes are discovered one at a time, rather than in parallel.

Figure 5:
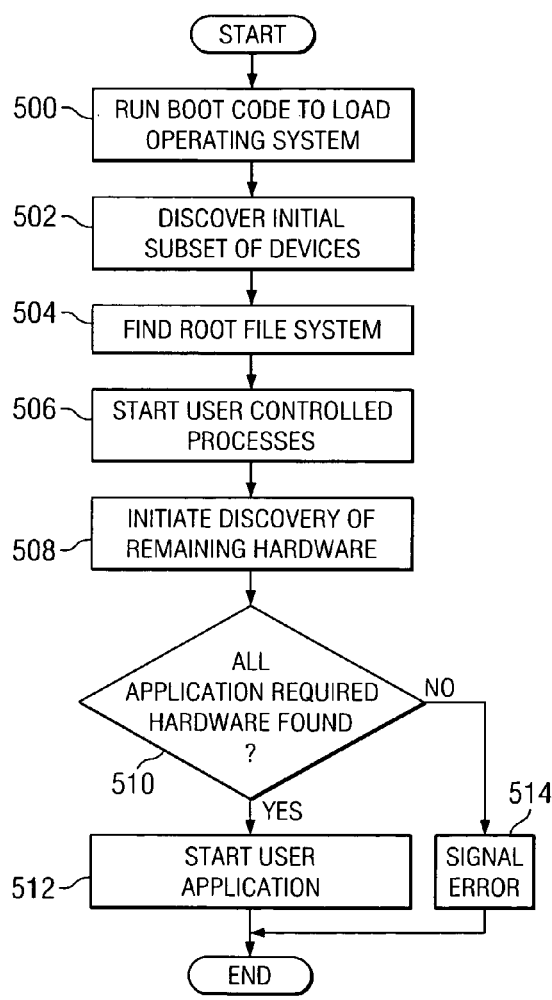
FIG. 5 is a flowchart of a process for deferred discovery of hardware in a data processing system in accordance with a preferred embodiment of the present invention.

Turning now to FIG. 5, a flowchart of a process for defered discovery of hardware in a data processing system is depicted in accordance with a preferred embodiment of the present invention. The process illustrated in FIG. 5 may be implemented in a data processing system, such as data processing system 200 in FIG. 2. In particular, these steps may be implemented in boot code and in operating systems for the data processing system.

The process begins by running boot code to load the operating system, (step 500). Thereafter, an initial subset of devices is identified (step 502). The mechanism of the present invention introduces the use of identifying only a subset of devices. Thereafter, the root file system is identified (step 504). User control processes are started (step 506). Steps 504 and 506 are normal steps taken during the booting or starting of a data processing system. Step 506 provides an ability to administer and control an operating system as well as initiate a fail over protocol.

Next, discovery of the remaining hardware is initiated (step 508). This step also is a new concept introduced by the mechanism of the present invention in which the discovery of the remaining hardware occurs after the use of space is operational. This mechanism may employ new features similar to existing hot plug or plug-in-play technology. Plug-in-play is an ability of a data processing system to have new devices, such as peripherals, added to the data processing system without having to restart the computer. Plug-in-play is also referred to as PnP and hot swapping.

Thereafter, a determination is made as to whether all application required hardware has been found (step 510). If all of the application required hardware has been found, then the user application is started (step 512) with the process terminating thereafter.

With reference again to step 510, if all of the hardware required for the applications have not been, an error is generated (step 514) with the process terminating thereafter. Steps 510, 512, 514 are steps currently found in operating system environments.

Figure 6:
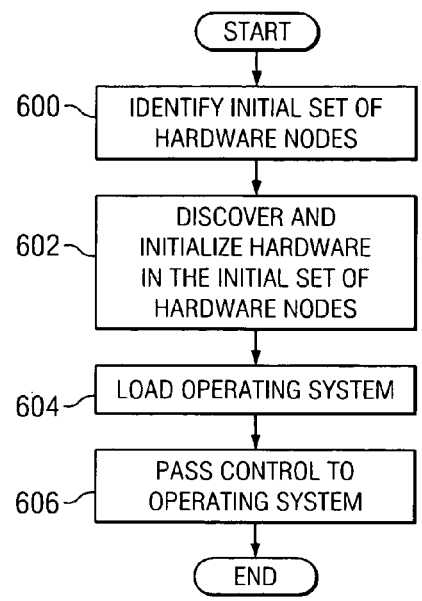
FIG. 6 is a flowchart of a boot process in accordance with the preferred embodiment of the present invention.

With reference now to FIG. 6, a flowchart of a boot process is depicted in accordance with the preferred embodiment of the present invention. The boot process in FIG. 6 is implemented as part as a boot program that is initiated to discover hardware, load an operating system and a data processing system, and pass control of the data processing system to the operating system. FIG. 6 is a more detailed description of step 500 in FIG. 5 above.

The process begins by identifying an initial set of hardware nodes (step 600). This initial set of hardware nodes is a subset of the hardware nodes in a data processing system. The set of hardware nodes is identified in these illustrative examples in a data structure, such as a configuration file based on this set of hardware.

The hardware nodes in this initial set is discovered and initialized (step 602). Thereafter, the operating system is loaded (step 604) and control is passed to the operating system (step 606) with the process terminating thereafter.

Figure 7:
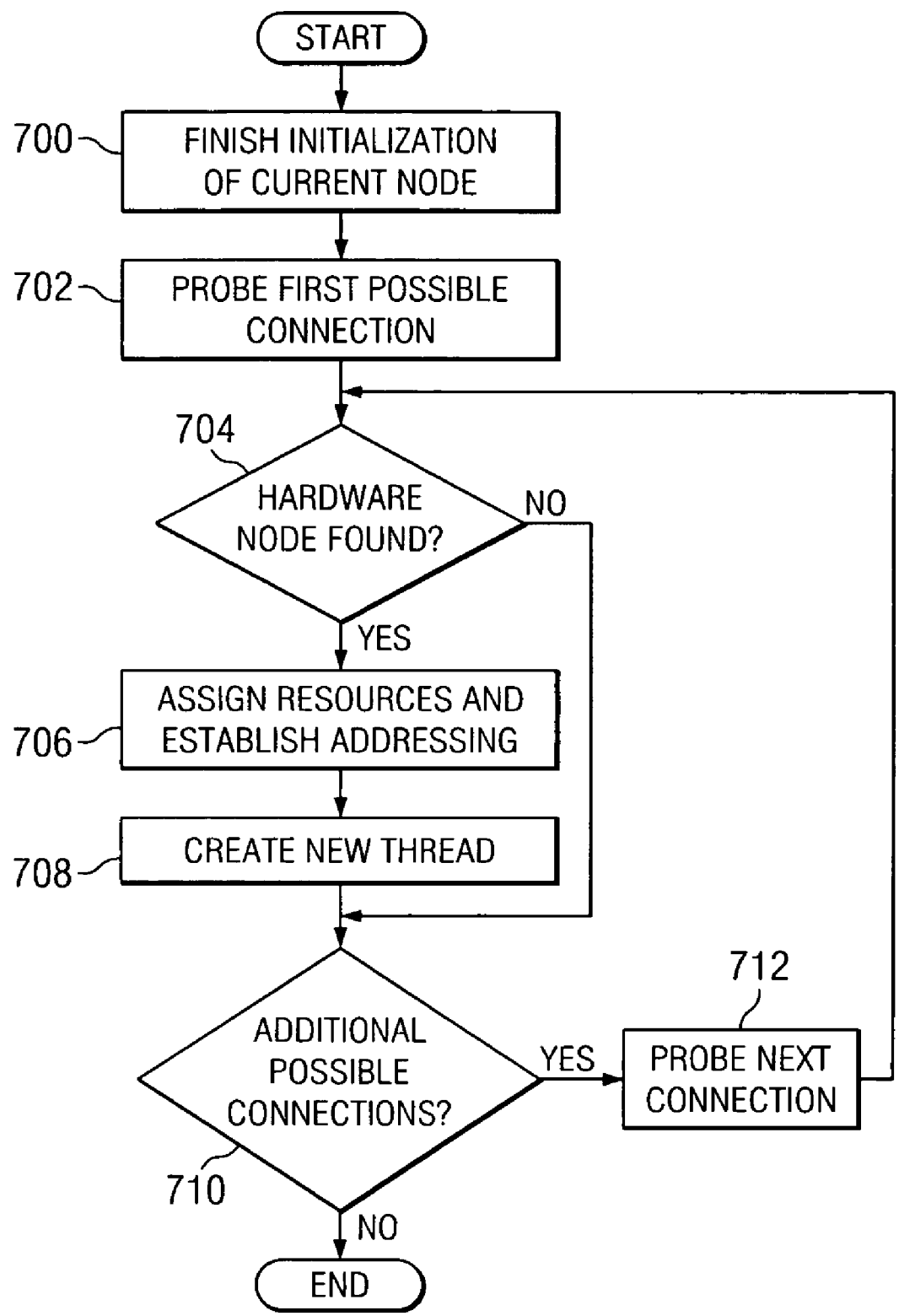
FIG. 7 is a flowchart of a process for identifying hardware nodes after a user environment is operational in accordance with a preferred embodiment of the present invention.

Turning now to FIG. 7, a flowchart of a process for identifying hardware nodes after a user environment is operational is depicted in accordance with a preferred embodiment of the present invention. The process illustrated in FIG. 7 may be implemented in a discovery process, such as discovery process 308 in FIG. 3. More specifically, the process illustrated in this Figure is an example of a process followed by a thread created for a hardware node.

The process begins by finishing initialization of the current node (step 700). Thereafter, a first possible connection is probed (step 702). A determination is as to whether a hardware node is found on the first connection (step 704). If a hardware node is found, resources are assigned to the hardware node and addressing is established for the hardware node (step 706).

Then, a new thread is created for the found hardware node (step 708). A determination is then made as to whether additional possible connections are present (step 710). If additional possible connections are present, the process probes the next connection (step 712) with the process then proceeding to step 704 as described above.

With reference again to step 710, if additional possible connections are not present, the process terminates. Turning back to step 704, if a hardware node is not found, the process proceeds to step 710 as described above.

Thus, the present invention provides an improved method, apparatus, and computer instructions for discovering hardware nodes in a data processing system. The mechanism of the present invention only looks for a subset of the hardware nodes in a data processing system during the initial boot up process prior to the operating system being loaded. Only those hardware nodes needed for the operating system to execute are discovered by the boot process and initial operating system discovery in these illustrative examples. Of course, more components than those minimally needed to run the operating system may be discovered during the initial boot process depending on the implementation.

The discovery of the rest of the hardware nodes is deferred until after the operating system has loaded and a multi-threaded environment is present and the base operating system is initialized. At that time, the discovery process that uses multiple threads to discover hardware nodes in parallel is employed. This parallel discovery reduces the amount of time needed to discover and initialize hardware nodes in a data processing system.

Further, by only discovering a subset of the hardware nodes during the initial boot up process, repetition of discovering hardware nodes is eliminated for many new nodes. In this manner, the mechanism of the present invention reduces the amount of time needed to boot a data processing system.

The mechanisms used for discovery and initialization of components after the operating system has been loaded may be implemented in different ways. For example, the mechanism used for adding hardware through "hot-plugging" hardware may be employed. In addition, some busses may allow the rediscovery of resources through the assistance of bios callbacks. Other mechanisms that may be used include device naming by identification and labeling, rather than probing devices in assignment order. This naming feature is often present to support buses that have a highly pluggable nature. In these examples, the threads are dynamically created as new nodes are discovered. These threads are created upon the discovery of a node that is connected to a bus.

The mechanism of the present invention also allows for a faster explicit service handoff in a clustered environment as opposed to requiring a timeout for a missing host. This is because we probe the required hand-off resources in the initial set and wait to probe the remaining resource required for the applications until after the handoff. It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for discovering hardware nodes having a hierarchical organization, through a deferred hardware discovery process operational in a user space, a kernel or both, the computer implemented method comprising: identifying and discovering only a minimum subset of hardware nodes in a file or by their connection to an input/output bridge, wherein the minimum subset of hardware nodes is a least selection of known hardware nodes necessary for an operating system to load and take control of the data processing system including at least one of the input/output bridge, a small computer system interface adapter, a hard disc drive, and a network adapter, and wherein the operating system supports parallel threads; responsive to discovering only the minimum subset of hardware nodes, suspending further discovery of undiscovered hardware nodes until creation of an operational user space environment in the operating system; initializing the minimum subset of the hardware nodes in the data processing system prior to loading the operating system; responsive to loading the operating system, creating the operational user space environment and conducting the further discovery of the undiscovered hardware nodes; generating, an initial thread for each known hardware node to form a set of initial threads, wherein the set of initial threads searches for the undiscovered hardware nodes only on a level below the each known hardware nodes, and wherein the set of initial threads allows for parallel discovery and initiation of hardware components connected to the undiscovered hardware nodes; responsive to discovery of each of the undiscovered hardware nodes, initializing, assigning resources to, and establishing addressing for the each of the undiscovered hardware nodes; creating an additional thread for the each of the undiscovered hardware nodes discovered to form a set of threads, wherein each thread in the set of threads searches for additional undiscovered hardware nodes only on a level below the each of the undiscovered hardware nodes, wherein the set of threads allows for parallel discovery and initiation of hardware components connected to the additional undiscovered hardware nodes; responsive to locating all application required hardware connected to the undiscovered hardware nodes and to the additional undiscovered hardware nodes, starting the application; and responsive to failing to locate all application required hardware, indicating an error.

* * * * *